Patented Sept. 21, 1937

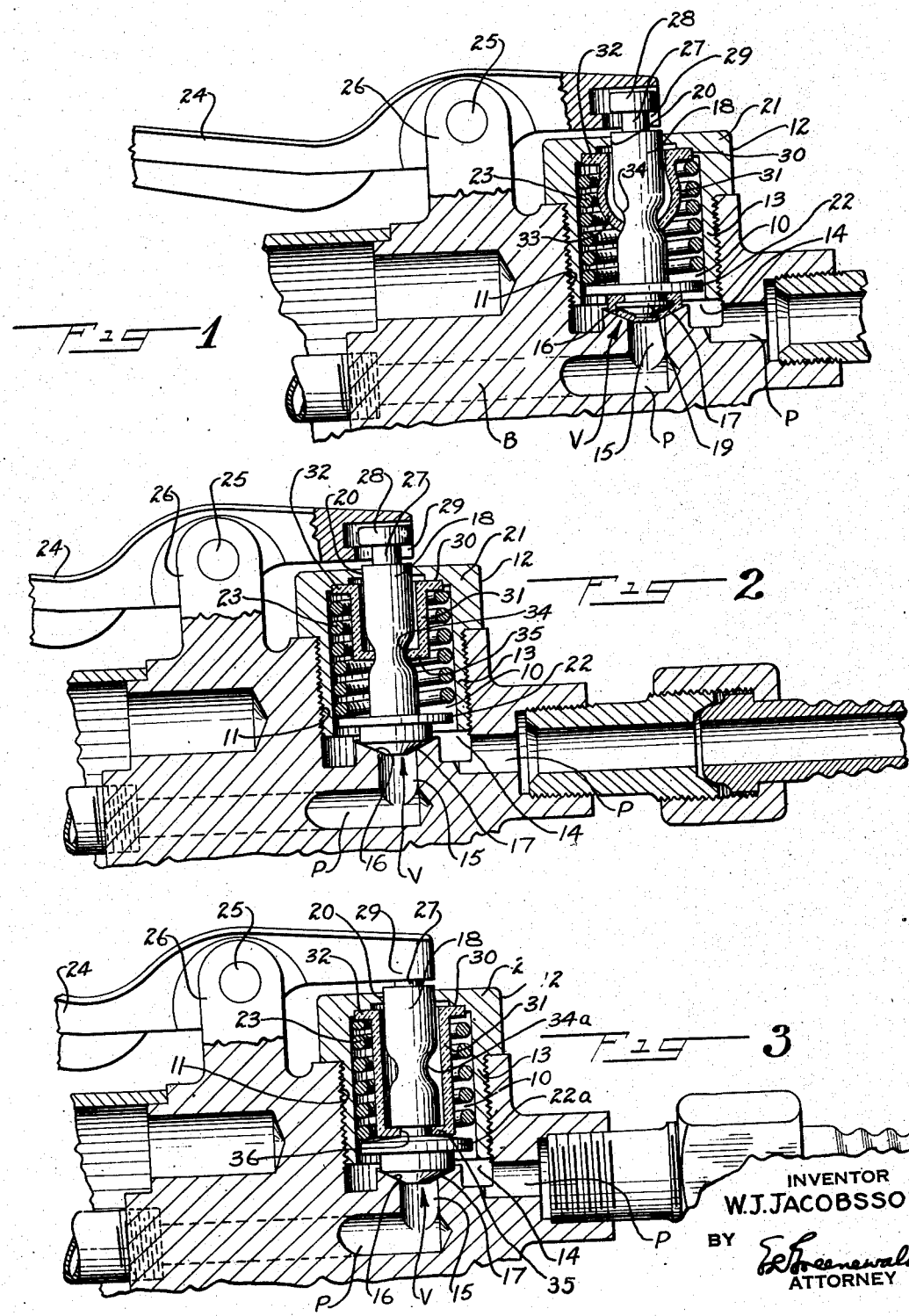

2,093,678

UNITED STATES PATENT OFFICE 2,093,678

VALVE

Wilgot J. Jacobsson, Elizabeth, N. J., assignor, by mesne assignments, to Union Carbide and Carbon Corporation, a corporation of New York Application July 17, 1934, Serial No. 735,652

6 Claims. (Cl. 251—31)

This invention relates to fluid impervious packings between relatively moving parts in apparatus such as valve mechanism and particularly to the provision of packing about a valve stem for preventing leakage therearound.

The invention has especial application to situations where a valve is used in controlling flow of fluid, as oxygen gas, through a conduit and in which the valve is operable from a point externally of the conduit passage by means connected with the valve by a stem extending through an aperture in the wall of the conduit. Packing ordinarily employed to prevent leakage through the aperture around the stem, when compressed sufficiently to make an initially leakproof connection, tends to retard movement of the stem and, in time, to wear under operation of the valve stem to an objectionably loose fit therewith thereby destroying its effectiveness to prevent leakage.

An important object of this invention is to provide, in valve or other similar mechanism of the above character, an improved packing and an improved interconnection thereof between the mechanism with which it is associated whereby a leakproof connection will be provided between the walls surrounding an aperture and a stem or equivalent member operable therethrough that will not deteriorate with use so as to lose its effectiveness or be destroyed or impaired by such use. Other objects and novel features of the invention will become apparent from the following specifications taken with the accompanying drawing illustrative of several forms of the invention and in which, Fig. 1 is a sectional fragmentary view showing one form of my invention applied to a blowpipe construction.

Fig. 2 is a view similar to Fig. 1 showing another form of the invention, and

Fig. 3 is a view similar to Fig. 1 showing a still further form of the invention.

The invention as illustrated in the drawing is applied to the control of the cutting oxygen passage of a hand operated cutting or deseaming blowpipe. The invention comprises, in the forms shown, a body B having a gas passage P therethrough, flow of fluid through which is under control of a valve V. The valve V may be located in a valve chamber 10 which is part of the inlet portion of passage P. The chamber 10 is formed partly in the body B by providing a bore 11 at right angles to the general direction of the passage P and partly in a plug 12 constituting a closure for bore 11 into which latter is threaded the hollow stem 13 of the plug. At the bottom of chamber 10 there are provided ports 14 and 15, respectively, providing communication between chamber 10 and the inlet and outlet portion of the passage P.

Preferably, the bottom of the chamber is provided with a raised valve seat 16 around the outlet port 15 and the valve V is provided with a head portion 17 adapted to seat in a tight leakproof contact with the seat. The head 17 is preferably made of resiliently yielding material, as rubber, and a valve stem 18 may be connected with the valve head by providing the stem with a knob 19 embedded in the material of the head to prevent its dislodgment therefrom. The stem 18 extends axially of chamber 10 and is movable through an aperture 20 in the head 21 of the plug 12. The valve stem 18 is preferably provided with a rigid flange 22, extending radially therefrom and positioned against the head 17. Between this flange and the head 21 of the plug 12 there may be positioned a helical spring 23 or other suitable yielding means for normally maintaining the valve head 17 in contact with its seat 16 and suitable means may be provided for raising the valve off of its seat against the force of this spring such as the lever 24 pivotally mounted, as at 25, upon supporting ears 26 secured to the body B. One arm of the lever 24 is connected to the stem 18 as shown by providing the stem with a neck 27 terminating in a head 28 received in a T slot 29 in one end of lever 24.

The sliding connection between the stem 18 and the head 21 of plug 12 is rendered leakproof by provision of a suitable packing 30 within the chamber 10. This packing is preferably of such construction and is so applied between the parts as to function without being subjected to any appreciable wear or other deteriorating influences in operation of the valve. To this end, the packing may comprise a tubular fluid impervious sleeve 31 of resilient material closely surrounding a portion of the stem 18 but normally spaced therefrom and hermetically sealed at one end to the head 21 of the plug 12 around the aperture 20 on the pressure side thereof. The sealing contact may be effected by providing this end of the sleeve 31 with a radially extending flange 32 which may be pressed against the surface of the head 21 by suitable means. Conveniently the helical spring 23 may serve this purpose, suitably positioned with one end resting on the flange 22. The sleeve 31 contacts at its other end with the stem 18 on an annular line so as to form a leakproof connection therewith. The sleeve may be made in any one of a number of forms, three of which are illustrated in the drawing. In all embodiments the sleeve is convex in the direction of fluid pressure.

In Fig. 1 the sleeve comprises a tubular member extending a distance along the stem 18 and having at its lower end a gradually constricted portion 33, the edge of which contacts with the stem and is pressed thereagainst by the resiliency of the material so as to form a leakproof connection therewith. This end of the sleeve is preferably received in an annular groove or depression 34 formed in the stem which provides shoulder abutments tending to limit or prevent any relative sliding movement between the stem and the end of the sleeve. This depression may be of such extent as to provide space for the folding or rolling of the sleeve upon itself during movement of the stem 18, and the sleeve preferably should be of such internal diameter throughout the greater part of its length as to normally space its inner surface from the stem. The outer surface of that portion of the stem surrounded by the sleeve is preferably quite smooth.

In the form of the invention shown in Fig. 2 the sleeve 31 is provided at one end with an external radial flange 32 adapted to be secured to the head 21 of plug 12 by spring 23, and at its other end with an internal flange 35 contacting with the stem 18 within the depression 34 so as to form a hermetical seal therebetween. The groove or depression 34, as before, will provide space for the rolling or folding of the sleeve upon itself in raising the valve.

In the form of apparatus shown in Fig. 3 the sleeve 31 is extended substantially the full length of that portion of the stem 18 located within the chamber 10. At its upper end this sleeve 31 is provided with an external flange 32' pressed against the inner surface of the head 21 by spring 23 as in the preceding forms of the invention. The lower end of the sleeve is provided with an internal flange 35 similar to that of Fig. 2 which rests with leakproof contact in an annular groove 36 adjacent a radial flange 22a. Flange 22a is therefore given a slight bevel on its upper surface to permit greater freedom of flexure of the flange 35. Intermediately of the ends of the sleeve 31 of this form of the invention, the stem 18 is provided with an annular depression 34a similar to depressions 34 in the other forms of the invention. The internal diameter of the tubular portion of sleeve 31 in this form is such as to normally space that portion of the sleeve from the stem 18, and the depression 34a provides for the rolling or folding of the sleeve upon itself during upward movement of the stem. The surface of the stem is also preferably quite smooth over that portion surrounded by the sleeve. The showing in the figures of the drawing is on an enlarged scale and certain proportions are exaggerated, as for example the space between the packing sleeve 31 and the stem 18 for clarity of illustration.

The invention while shown and described in connection with a particular construction may be applied to various situations wherever a leakproof seal is desired between two moving parts, one of which slides within the other. I do not wish therefore to be limited to any precise or specific construction or application of my invention except as I shall be limited by the scope of the following claims liberally construed and the state of the prior art.

I claim:

1. In valve mechanism, the combination of a casing having a valve chamber therein and fluid conduits leading to and from the chamber; a port connecting the chamber and one of the conduits; a chambered screw threaded into the chamber and having an aperture for accommodation of a valve stem; a valve in control of said port having a stem movable through said aperture; a spring in the chamber of the screw bearing at its ends respectively against the valve and the end of chamber of the screw; and a sleeve having a flange surrounding the aperture and pressed by the spring into hermetical contact with the end of the chamber around the aperture, the other end of the sleeve contacting with the stem on a circular line around the stem and frictionally sealed thereto.

2. In valve mechanism, the combination of a casing having a fluid passage therethrough and an aperture in the wall of the passage; a valve in control of the flow of fluid through the passage and having a movable stem extending through said aperture; said stem having a narrow annular groove adjacent the valve and an annular depression of comparatively wide spread intermediate its ends; a sleeve of fluid impervious flexible material hermetically secured at one end to the wall of the passage on a line around the aperture and having a portion at its other end secured in said narrow groove, said depression being adapted to receive a portion of said sleeve when said stem is moved in such a manner as to tend to shorten said sleeve.

3. In a valve, the combination comprising an outer casing having an aperture therethrough; an inner member disposed within said casing and movable through said aperture, said inner member having an annular groove formed therein adjacent the end opposite said aperture and a second annular groove formed therein substantially intermediate the ends of said inner member; a resilient sleeve having one end thereof adapted to be held against said casing adjacent said aperture so as to form a hermetical seal therewith and the opposite end thereof being constricted and adapted to contact said inner member within said first-mentioned groove so as to form a hermetical seal with said inner member, said intermediate groove being adapted to receive a portion of said sleeve when said inner member is moved toward said aperture; means for moving said inner member; and means for holding said first-mentioned end of said sleeve against said casing adjacent said aperture.

4. In valve mechanism, the combination of a casing having a fluid passage therethrough and an aperture in the wall of the passage; a valve in control of the flow of fluid through the passage and having a stem extending through said aperture and movable therethrough; and a sleeve of fluid impervious flexible material hermetically secured at one end to the wall of the passage on a line around the aperture and at the other end having a restricted portion hermetically secured to said stem; said stem having an annular depression disposed substantially intermediately of and spaced from each of the ends of said sleeve, said depression being of comparatively wide spread so as to receive a portion of said sleeve when said stem is moved in a manner tending to shorten said sleeve.

5. In valve mechanism, the combination of a casing having a valve chamber therein, fluid conduits leading to and from said chamber, and a port connecting said chamber and one of said conduits; a closure for said chamber threaded to said casing and having an aperture; a valve within said chamber, said valve controlling said port and having a stem projecting from said chamber through said aperture, said stem having a comparatively wide circumferential depression intermediate its ends and smooth cylindrical portions adjacent both sides of said depression; a sleeve of fluid impervious and resilient material having a cylindrical portion normally disposed closely adjacent at least one of the cylindrical portions of said stem, one end of said sleeve having an outwardly extending flange bearing in hermetical contact against the interior of said closure around said aperture, and the other end of said sleeve contacting with said stem within said depression and being frictionally sealed to said stem, said depression being adapted to receive a portion of said sleeve as said stem is moved in a manner tending to shorten said sleeve.

6. In valve mechanism, the combination of a casing having a valve chamber therein, fluid passages leading to and from the chamber, and a port connecting the chamber and one of the passages; a closure member having an aperture for accommodation of a valve stem and also having a hollow portion extending into and secured within said chamber; a valve in control of said port having a stem movable through said aperture; a sealing sleeve disposed within the hollow portion of said closure member and having at one end thereof a flange surrounding the aperture, the other end of the sleeve being frictionally sealed to the stem and contacting the stem on a circular line around the stem; and means exerting pressure upon the flange of said sleeve so as to hold said flange in hermetical contact with the closure member around the aperture.

WILGOT J. JACOBSSON.